(12) United States Patent
Rappoport et al.

(10) Patent No.: US 9,098,242 B2
(45) Date of Patent: Aug. 4, 2015

(54) ELECTRONIC DEVICES WITH COVER LAYERS MOUNTED TO DISPLAYS

(75) Inventors: Benjamin M. Rappoport, Los Gatos, CA (US); Jeremy C. Franklin, San Francisco, CA (US); Stephen Brian Lynch, Portola Valley, CA (US); Scott A. Myers, San Francisco, CA (US); John Raff, Menlo Park, CA (US); Richard P. Howarth, San Francisco, CA (US); Wei Chen, Palo Alto, CA (US); Christopher Stringer, Woodside, CA (US); Julian Hoenig, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 277 days.

(21) Appl. No.: 13/249,734

(22) Filed: Sep. 30, 2011

(65) Prior Publication Data

US 2013/0083491 A1    Apr. 4, 2013

(51) Int. Cl.
*H05K 7/02* (2006.01)
*G06F 1/16* (2006.01)

(52) U.S. Cl.
CPC .................................... *G06F 1/1656* (2013.01)

(58) Field of Classification Search
CPC .................................................. G06F 1/1656
USPC ........... 361/679.02, 679.09, 679.155, 679.21, 361/679.56, 807, 852; 345/173, 182, 424
See application file for complete search history.

(56) References Cited

U.S. PATENT DOCUMENTS

| | | | |
|---|---|---|---|
| 4,066,855 A | 1/1978 | Zenk | |
| 4,085,302 A | 4/1978 | Zenk et al. | |
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |

(Continued)

FOREIGN PATENT DOCUMENTS

| | | |
|---|---|---|
| JP | 2000163031 | 6/2000 |
| JP | 2002342033 | 11/2002 |
| JP | 2010060866 | 8/2010 |

OTHER PUBLICATIONS

Raff et al., U.S. Appl. No. 13/452,061, filed Apr. 20, 2012.

(Continued)

*Primary Examiner* — Yuriy Semenenko
(74) *Attorney, Agent, or Firm* — Treyz Law Group; Kendall P. Woodruff

(57) ABSTRACT

An electronic device may be provided with a display cover layer mounted to the device using an adhesive bond with a display. The display may be a flexible display. The flexible display may include Organic Light Emitting Diode display technology. The display may be mounted to a rigid support structure. The rigid support structure may be mounted to a device housing member. Mounting the display cover layer to the display may eliminate the need to mount the display cover layer to the device housing and may allow active display pixels to be visible under the display cover layer closer to the device housing than in conventional devices. Providing the electronic device with active display pixels closer to the device housing may reduce the need for an inactive border around the display and may improve the aesthetic appeal of the electronic device.

14 Claims, 13 Drawing Sheets

(56) References Cited

U.S. PATENT DOCUMENTS

| | | |
|---|---|---|
| 6,310,610 B1 | 10/2001 | Beaton et al. |
| 6,323,846 B1 | 11/2001 | Westerman et al. |
| 6,690,387 B2 | 2/2004 | Zimmerman et al. |
| 6,803,245 B2 | 10/2004 | Auch et al. |
| 7,015,894 B2 | 3/2006 | Morohoshi |
| 7,034,913 B2 | 4/2006 | Ishida |
| 7,184,064 B2 | 2/2007 | Zimmerman et al. |
| 7,541,671 B2 | 6/2009 | Foust et al. |
| 7,663,607 B2 | 2/2010 | Hotelling et al. |
| 7,834,451 B2 | 11/2010 | Lee et al. |
| 8,218,306 B2 * | 7/2012 | Lynch et al. ............... 361/679.3 |
| 2006/0026521 A1 | 2/2006 | Hotelling et al. |
| 2006/0197753 A1 | 9/2006 | Hotelling |
| 2009/0167171 A1 | 7/2009 | Jung et al. |
| 2009/0174995 A1 * | 7/2009 | Prest et al. ............... 361/679.21 |
| 2009/0243817 A1 * | 10/2009 | Son ............................ 340/407.2 |
| 2009/0256471 A1 | 10/2009 | Kim et al. |
| 2010/0026952 A1 | 2/2010 | Miura et al. |
| 2010/0061055 A1 * | 3/2010 | Dabov et al. ............. 361/679.56 |
| 2010/0073593 A1 * | 3/2010 | Sasaki et al. .................... 349/58 |
| 2010/0156841 A1 * | 6/2010 | Wang et al. .................... 345/174 |
| 2010/0315399 A1 | 12/2010 | Jacobson et al. |
| 2011/0086680 A1 | 4/2011 | Kim et al. |
| 2011/0273383 A1 * | 11/2011 | Jeon et al. ..................... 345/173 |
| 2012/0127087 A1 | 5/2012 | Ma |
| 2012/0218219 A1 | 8/2012 | Rappoport et al. |
| 2013/0002572 A1 * | 1/2013 | Jin et al. ........................ 345/173 |

OTHER PUBLICATIONS

Myers et al., U.S. Appl. No. 13/108,256, filed May 16, 2011.
Rothkopf et al., U.S. Appl. No. 13/171,295, filed Jun. 29, 2011.
Rothkopf et al., U.S. Appl. No. 13/177,165, filed Jul. 6, 2011.
Lynch, U.S. Appl. No. 13/184,303, filed Jul. 15, 2011.
Chen et al., U.S. Appl. No. 13/186,238, filed Jul. 19, 2011.
Myers et al., U.S. Appl. No. 13/246,510, filed Sep. 27, 2011.
Martisauskas et al., U.S. Appl. No. 13/229,120, filed Sep. 9, 2011.
Franklin et al., U.S. Appl. No. 13/250,227, filed Sep. 30, 2011.
Franklin et al., U.S. Appl. No. 13/250,666, filed Sep. 30, 2011.
Drzaic et al., U.S. Appl. No. 13/252,971, filed Oct. 4, 2011.
Rappoport et al., U.S. Appl. No. 13/273,851, filed Oct. 14, 2011.
Franklin et al., U.S. Appl. No. 13/310,409, filed Dec. 2, 2011.
Franklin et al., U.S. Appl. No. 13/422,724, filed Mar. 16, 2012.

\* cited by examiner

US 9,098,242 B2

ELECTRONIC DEVICES WITH COVER LAYERS MOUNTED TO DISPLAYS

BACKGROUND

This relates generally to electronic devices, and more particularly, to displays for electronic devices.

Electronic devices often include displays. Displays such as liquid crystal displays (LCDs) are often formed from multiple layers held together using adhesive at the edges of the LCD display. The adhesive at the edges of the display may fail if other device components such as a display cover layer are mounted to the display in a way that exerts pulling forces on the layers of the LCD display. For this reason, display cover layers are typically mounted directly to device housings while displays are mounted behind the display cover layers. Display cover layers mounted to device housings require a significant amount of inactive border area around the display in the region where the display cover layer is mounted to the device housing. It is not uncommon for the width of the inactive border to be up to a centimeter wide or more. This type of wide inactive region tends to make displays bulky and requires the use of electronic device housings with wide bezels.

It would therefore be desirable to be able to minimize the width of the inactive region in a display and to otherwise improve displays for electronic devices.

SUMMARY

An electronic device may be provided that has a display such as a flexible display. Flexible displays may include organic light-emitting diode (OLED) displays. OLED displays contain pixels that can produce illumination without using a separate backlight unit.

Flexible OLED displays may include display layers that are bonded together using transparent adhesives. The transparent adhesive layers in a display can extend across substantially the entire surface of the display and need not be confined to the periphery of the display. As a result, adhesive bonds between OLED display layers may be robust enough to allow device components to be attached to a device by mounting the device components directly to the OLED display.

A display cover layer such as a transparent layer of glass or plastic may be mounted to a flexible display. The flexible display may be mounted to a rigid support structure. The rigid support structure may be mounted to device housing structures. The display cover layer may be mounted to the device primarily or exclusively by attaching the display cover layer to the flexible display with adhesive. Rigid mounting structures may be formed from active or inactive components of the device. Rigid support structures may be mounted to device housing structures using screws or other fasteners, clips, protrusions and mating recesses, grooves, and other engagement features, glue, welds, or other suitable attachment mechanisms.

Further features of the invention, its nature and various advantages will be more apparent from the accompanying drawings and the following detailed description.

DETAILED DESCRIPTION

Electronic devices may include displays. Displays may be used to display visual information such as text and images to users.

Figure 1:
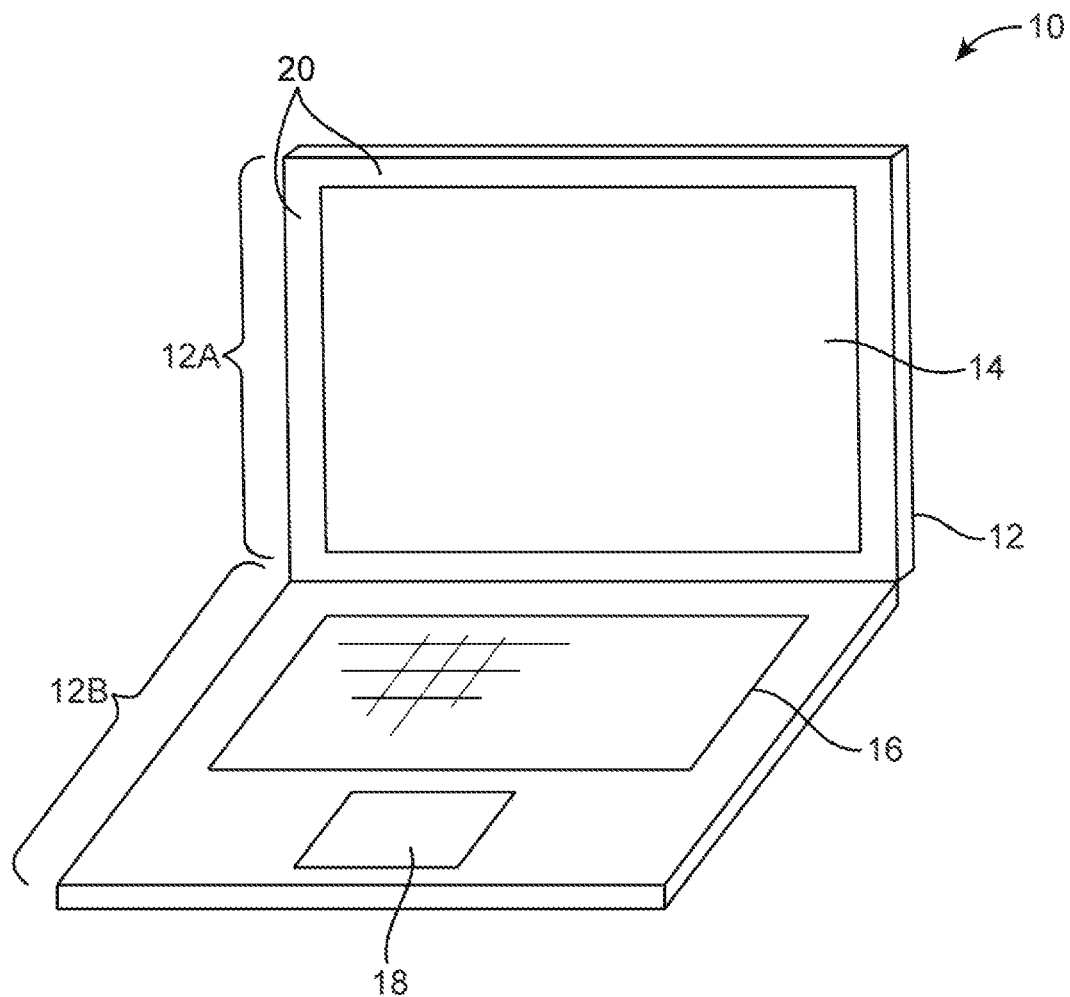
FIG. 1 is a perspective view of an illustrative electronic device such as a laptop computer with a display in accordance with an embodiment of the present invention.
Figure 2:
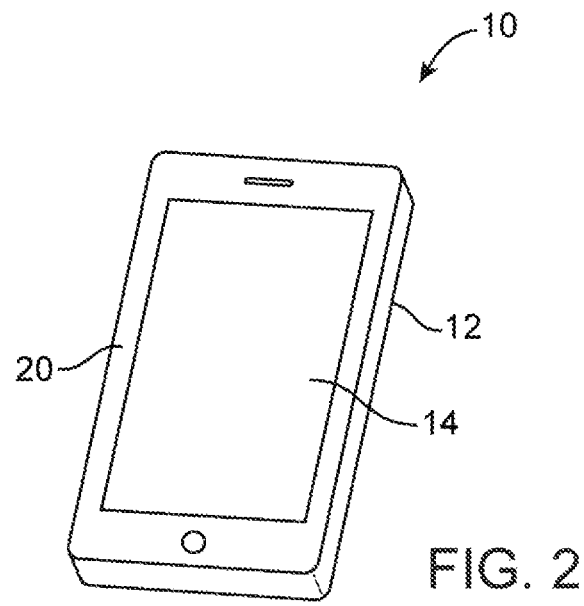
FIG. 2 is a perspective view of an illustrative electronic device such as a handheld electronic device with a display in accordance with an embodiment of the present invention.
Figure 3:
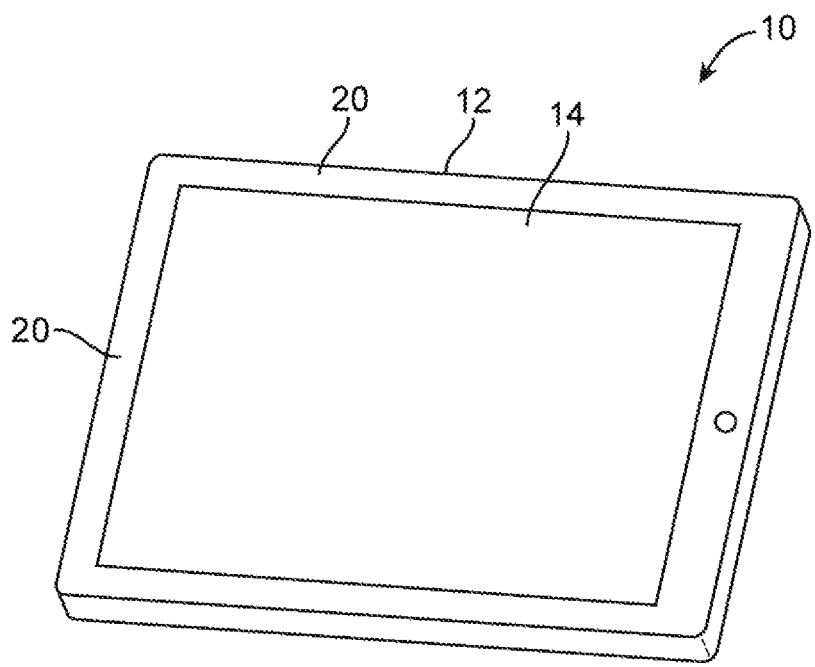
FIG. 3 is a perspective view of an illustrative electronic device such as a tablet computer with a display in accordance with an embodiment of the present invention.

Illustrative electronic devices that may be provided with displays are shown in FIGS. 1, 2, and 3. FIG. 1 shows how electronic device 10 may have the shape of a laptop computer having upper housing 12A and lower housing 12B with components such as keyboard 16 and touchpad 18. FIG. 2 shows how electronic device 10 may be a handheld device such as a cellular telephone, music player, gaming device, navigation unit, or other compact device. FIG. 3 shows how electronic device 10 may be a tablet computer. These are merely illustrative examples. Electronic devices such as illustrative electronic device 10 of FIGS. 1, 2, and 3 may be laptop computers, computer monitors with embedded computers, tablet computers, cellular telephones, media players, other handheld and portable electronic devices, smaller devices such as wristwatch devices, pendant devices, headphone and earpiece devices, other wearable and miniature devices, or other electronic equipment.

Device 10 may have a housing such as housing 12. Housing 12, which is sometimes referred to as a case, may be formed of materials such as plastic, glass, ceramics, carbon-fiber composites and other composites, metal, other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Device 10 may have one or more displays such as display 14. Display 14 may be an organic light-emitting diode (OLED) display or other suitable display. Display layer 14 may include display pixels formed from light-emitting diodes (LEDs), organic LEDs (OLEDs), plasma cells, electronic ink elements, liquid crystal display (LCD) components, or other suitable display pixel structures compatible with flexible displays. Display 14 may, if desired, include capacitive touch sensor electrodes for a capacitive touch sensor array or other touch sensor structures (i.e., display 14 may be a touch screen). Touch sensor electrodes may be provided on a touch panel layer that is interposed between an organic light-emitting diode display layer and a transparent cover layer (e.g., a cover glass layer), may be formed on the underside of a cover layer, or may otherwise be incorporated into display 14.

The display (sometimes referred to as the display layer, the OLED display, the flexible display or flexible OLED display) may have a planar rectangular active region in its center. The rectangular active region includes an array of light-emitting diode pixels. Display 14 may include an inactive portion at the edges of display 14. The inactive portion of the display is shown as inactive border region 20 in FIGS. 1, 2, and 3.

To enhance device aesthetics, the width of inactive border region 20 that is visible from the front of the display may be minimized by mounting a display cover layer (e.g., a cover glass layer) to the device using an adhesive that is interposed between the display cover layer and a flexible display such as an Organic Light-Emitting Diode (OLED) display.

Figure 4:
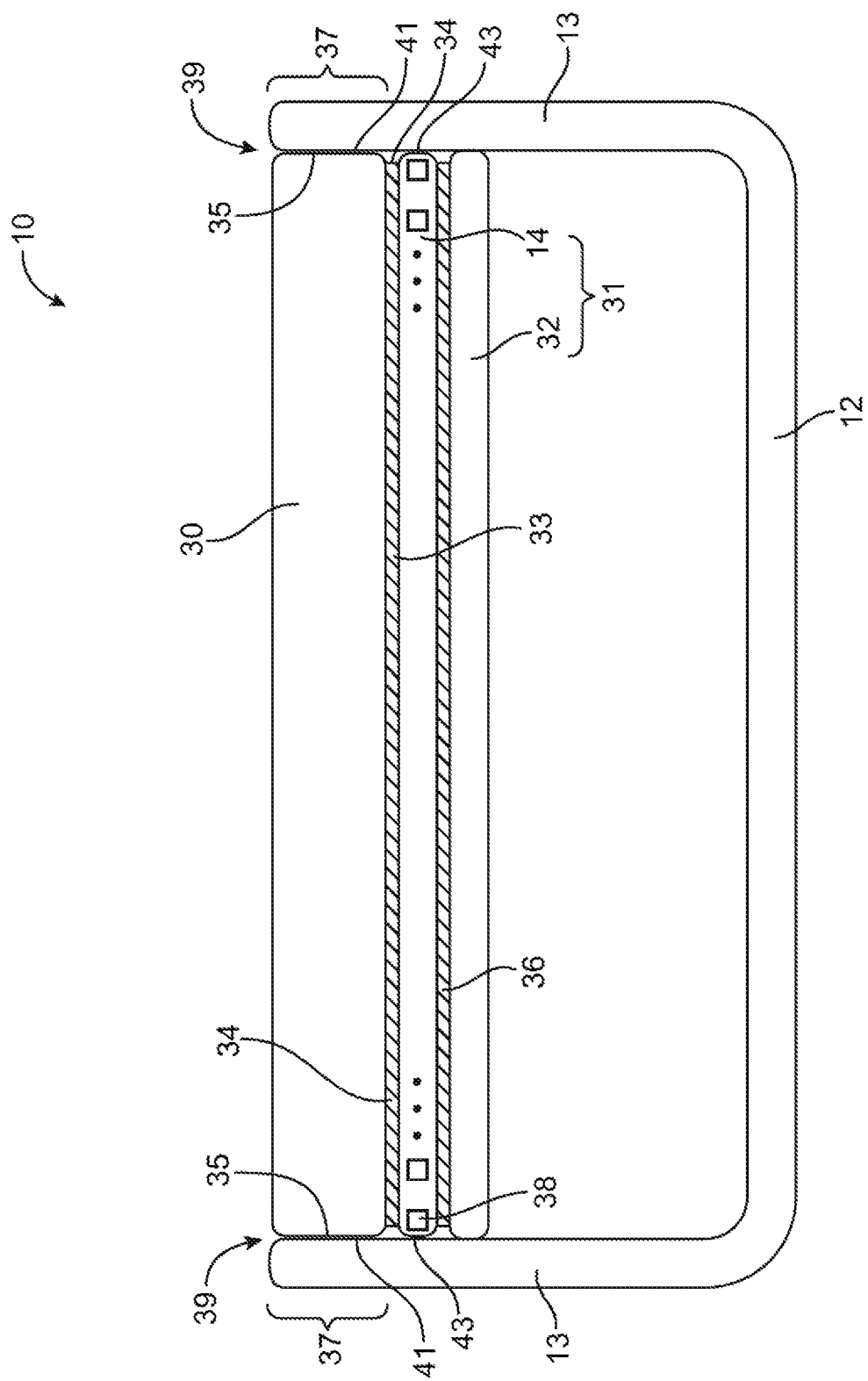
FIG. 4 is a cross-sectional side view of an illustrative electronic device having device components such as a cover layer mounted to a flexible display in accordance with an embodiment of the present invention.

A cross-sectional side view of an illustrative electronic device having a cover layer mounted to the device using lamination (e.g., an adhesive bond) to the device display is shown in FIG. 4. As shown in FIG. 4, device 10 may include a rigid internal component such as component 32 and a display such as flexible display 14. Flexible display 14 may be attached to component 32 to form a mounting platform such as mounting platform 31.

Device 10 may include a transparent cover layer such as display cover layer 30 (sometimes referred to herein as a cover layer, a transparent cover layer, a display cover layer, a display cover glass, or a cover glass). Cover layer 30 may be mounted to mounting platform 31 using an adhesive such as adhesive 34 that is interposed between cover layer 30 and flexible display 14. Transparent cover layer 30 may be formed from glass, plastic, or other suitable transparent material. Display 14 may have opposing top and bottom sides. Cover layer 30 may have a bottom side such as bottom side 33 and an edge such as outermost edge 35.

As shown in FIG. 4, bottom side 33 of cover layer 30 may be mounted to the top side of display 14. Housing 12 may include housing structures such as housing sidewalls 13. Cover layer 30 may be mounted to mounting platform 31 (i.e., component 32 and flexible display 14) so that outermost edge 35 is mounted abutting portion 37 of housing sidewall 13. Cover layer 30 may be mounted to flexible display 14 using adhesive 34 so that interface 39 between housing structure 13 and cover layer 30 may be free of adhesive. In configurations in which cover layer 30 is attached to mounting platform 31 using adhesive 34, housing 12 and cover layer 30 may form an enclosure for device 10.

Rigid component 32 may be mounted to the bottom side of display 14. Component 32 may be mounted to the bottom side of display 14 using an adhesive material such as adhesive 36. Component 32 may be an active or inactive component of device 10. Component 32 may be a rigid support structure or may be a device component such as battery, printed circuit board (PCB) or other active component or electrical component. Component 32 may be mounted to device housing 12. Component 32 may, for example, be mounted to device housing structures such as housing 12 using screws or other fasteners, clips, protrusions and mating recesses, grooves, and other engagement features, glue, welds, or other suitable attachment mechanisms.

Displays such as flexible OLED displays may have display layers that are bonded together in a way that provides more internal strength than conventional displays. Cover layer 30 may therefore be mounted to device 10 without mounting cover layer 30 to housing 12 (e.g., using an interface between cover layer 30 and housing 12 that is free of adhesive and other connecting material).

In configurations in which cover layer 30 is mounted to flexible display 14, active display pixels such as pixels 38 in display 14 may be formed along outermost edge 35 of cover layer 30 (e.g., adjacent to portion 37 of housing 12). Active display pixels along outermost edge 35 of cover layer such as cover layer 30 that is mounted to flexible display 14 may be visible to a user of device 10 under cover layer 30. In this way, inactive portion 20 (see FIG. 1) may be reduced in size or eliminated, thereby improving the aesthetic appearance of device 10.

As shown in FIG. 4, housing sidewall structure 13 may have an interior surface such as inner sidewall surface 41. Flexible display 14 may have a peripheral edge 43. Display cover layer 30 may have a peripheral edge corresponding to outermost edge 35. As shown in FIG. 4, peripheral edge 43 of flexible display 14 and peripheral edge 35 of display cover layer 30 may be aligned and may contact inner sidewall surface 41 of housing structure 13.

Figure 5:
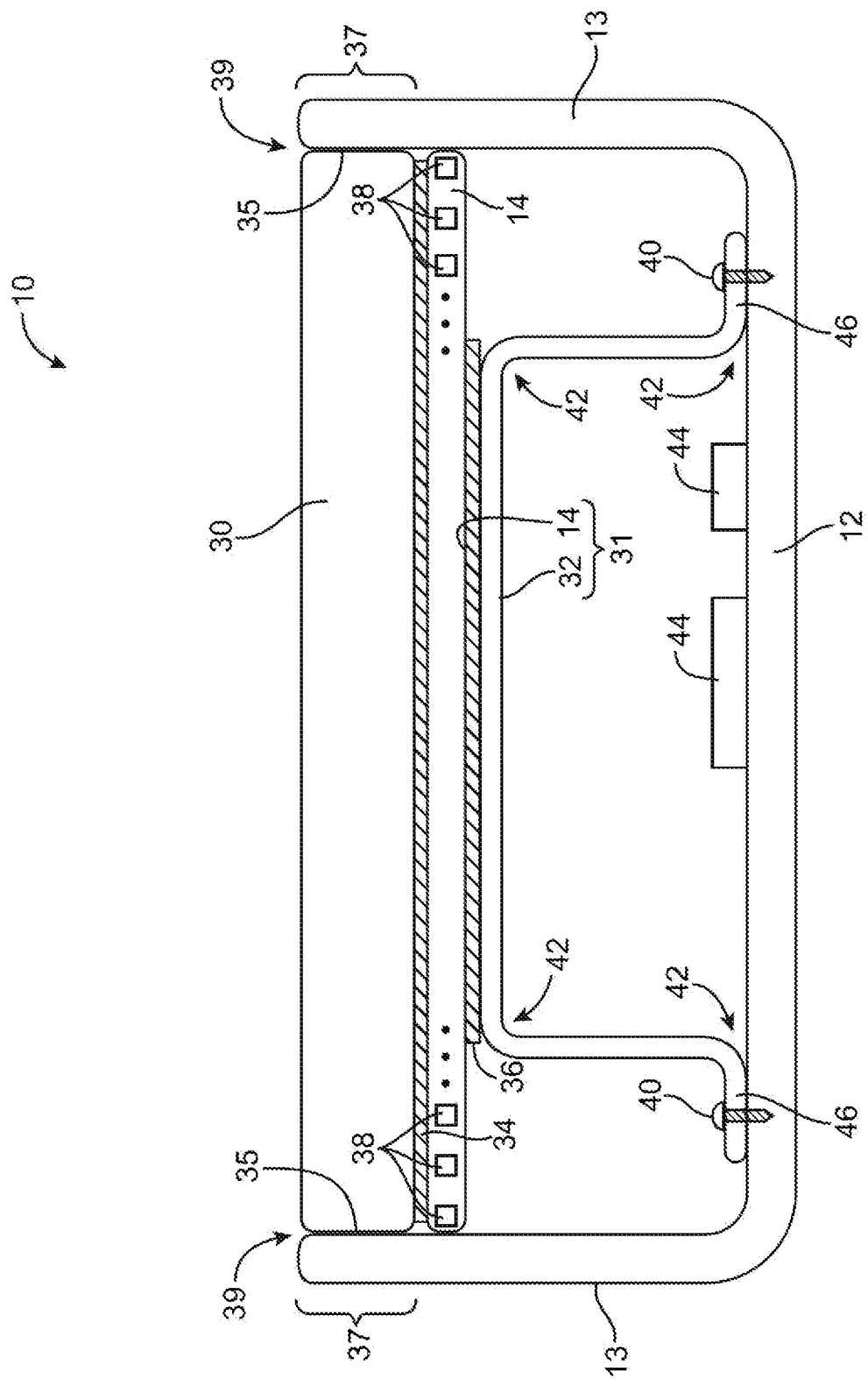
FIG. 5 is a cross-sectional side view of an illustrative electronic device having a rigid support structure mounted to a device housing using screws in accordance with an embodiment of the present invention.

FIG. 5 shows an illustrative mounting platform 31 that includes a component 32 that is formed from a rigid support structure for mounting display 14 (and consequently cover glass 30) to device 10. As shown in FIG. 5, component 32 may be formed from a rigid support structure having one or more bends 42. Bends 42 in rigid support structure 32 may allow rigid support structure 32 to be mounted to housing 12 while allowing space for additional internal components 44.

Additional internal components 44 may include batteries, PCB's, integrated circuits, speakers, vibrators, or other components. In the example of FIG. 5, rigid support structure 32 is attached to housing 12 using one or more screws such as screws 40. Portions 46 of component 32 may be provided with openings such as holes that allow screws 40 to pass through portions 46 and into housing 12.

Figure 6:
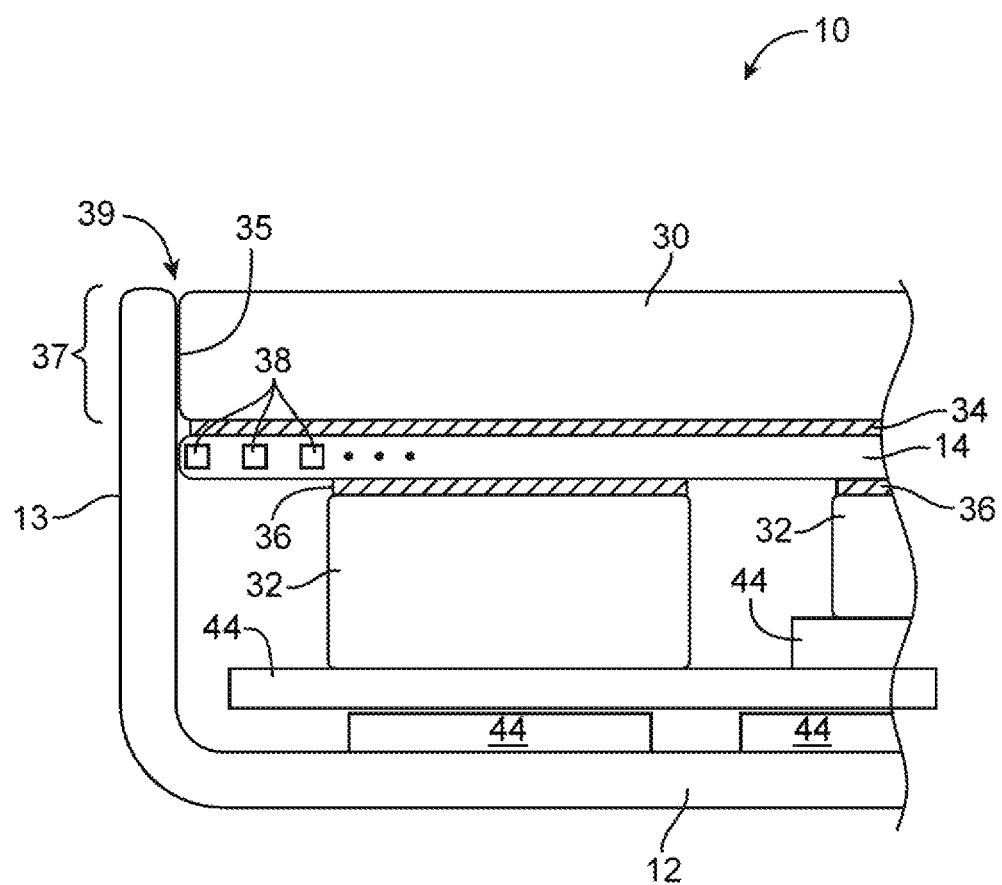
FIG. 6 is a cross-sectional side view of an illustrative electronic device having a flexible display mounted to active internal components in accordance with an embodiment of the present invention.

FIG. 6 shows an illustrative component 32 that is formed from one or more active internal components of device 10. As shown in FIG. 6, display 14 may be mounted to active components 32 using a bonding material such as adhesive 36. Active internal components 32 may be electrical components, mechanical components or other active components (e.g., batteries, printed circuit boards, integrated circuits, communications components, etc.). Active internal components 32 may be mounted to other active internal components such as other internal components 44. Other internal components 44 may be mounted to additional internal components 44 or may be mounted to housing 12.

The example of FIG. 6 is merely illustrative. If desired, active components 32 may be mounted directly to housing 12. Components 32 may be mounted to other components 44 using adhesive, mechanical attaching members, electrical bonding material (e.g., solder or conductive adhesive) or other suitable mounting methods. As shown in FIG. 6, cover glass 30 may be mounted to display 14 using adhesive layer 34. Cover glass 30 may be mounted to device 10 using an adhesive bond to a display such as display 14 that is mounted to active internal components such as components 32.

Figure 7:
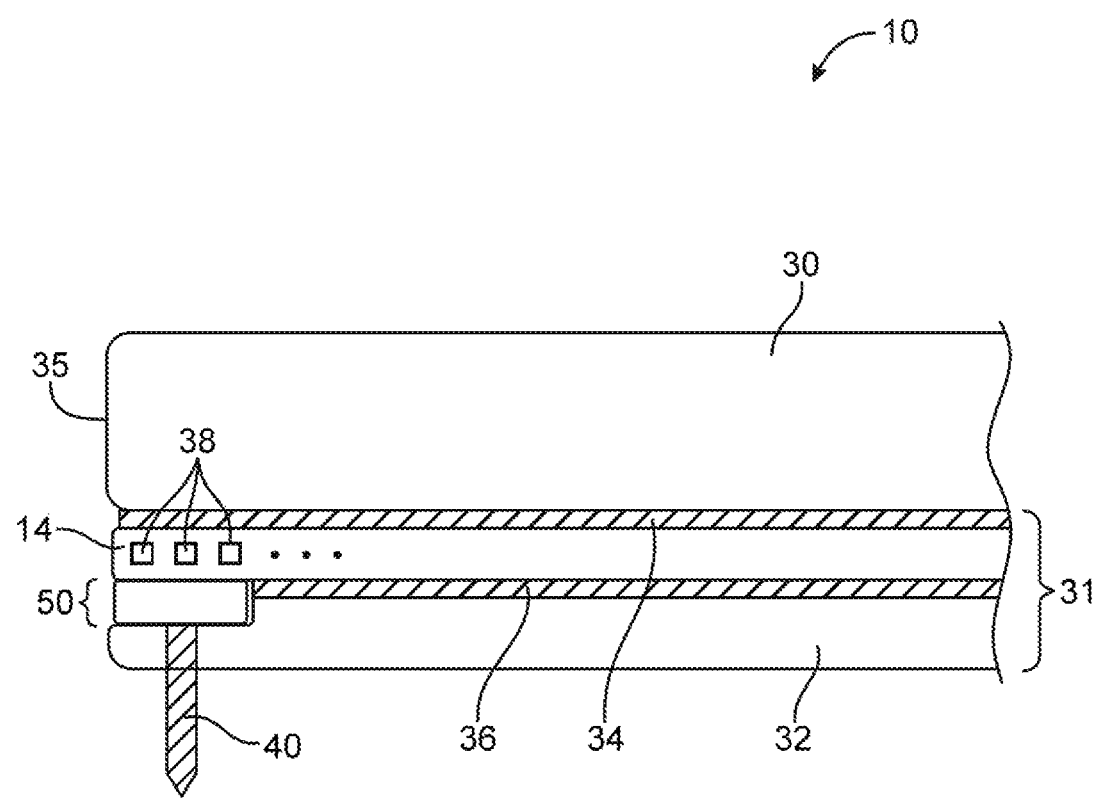
FIG. 7 is a cross-sectional side view of an illustrative electronic device having a rigid support structure with a recessed landing platform for an attachment member in accordance with an embodiment of the present invention.

FIG. 7 shows an illustrative component 32 that is formed from a rigid support structure that is substantially straight. As shown in FIG. 7, rigid support structure 32 may include a recess such as recess 50. Recess 50 may provide space for the head of a fastener such as screw 40. In the example of FIG. 7 rigid support structure 32 is formed from a single structure. Recess 32 may be formed on rigid support structure 32 using a metal etching procedure, a mechanical grinding procedure or other suitable procedure for producing recess 50. This is merely illustrative. If desired, rigid support structure 32 may be formed from more than one structure.

Figure 8:
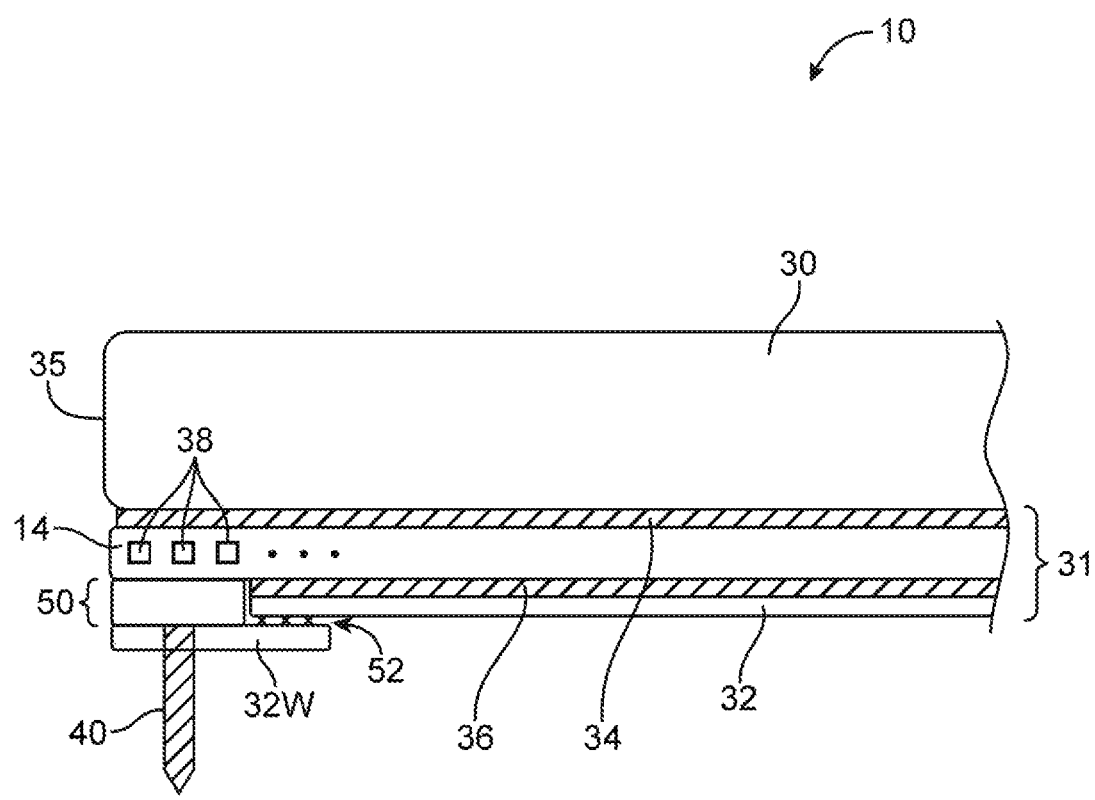
FIG. 8 is a cross-sectional side view of an illustrative electronic device having a rigid support structure with multiple welded portions in accordance with an embodiment of the present invention.
Figure 9:
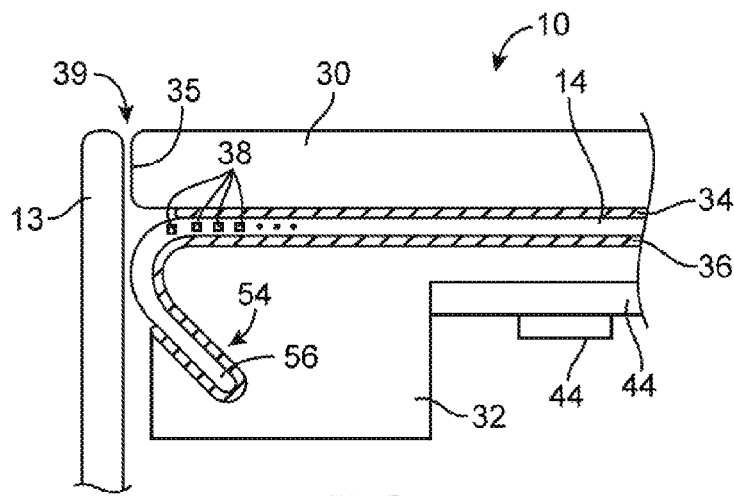
FIG. 9 is a cross-sectional side view of an illustrative electronic device having a rigid support structure with a slot for a portion of a flexible display in accordance with an embodiment of the present invention.

In the scenario in which rigid support structure 32 is formed from multiple structures, the structures may be welded to form a recess such as recess 50 as shown in FIG. 8. In the example of FIG. 8, rigid support structure 32 includes an additional structure 32W that is welded to rigid support structure 32 at weld 52. Additional structure 32W may be welded to rigid support structure 32 so that space 50 is provided for the head of a fastener such as screw 40. In the examples of FIGS. 8 and 9, screw 40 may be using to attach rigid support member 32 to other components of device 10 (e.g., housing 12, active components 44, or other components). Display 14 may be attached to rigid support member 32 using adhesive 36. Cover layer 30 may be attached to device 10 by attaching cover layer 30 to display 14 using adhesive 34.

FIG. 9 shows an illustrative component 32 that is formed from a rigid support structure having an opening for mounting a portion of a flexible display. As shown in FIG. 9, rigid support structure 32 may include an opening such as slot 54. Flexible display 14 may be mounted to rigid support structure 32 so that a portion such as portion 56 of flexible display 14 is bent around a portion of rigid support structure 32 into slot 54.

To ensure that flexible display 14 is not damaged during the bending process, bending operations may be performed that limit bending to an acceptable bend radius R. The value of R may be, for example, about 3 to 5 times the thickness of the bent material (e.g., bend radius R may be about 0.2 to 0.5 mm). Portion 56 of flexible display 14 may be attached to the sidewalls of slot 54 using adhesive 34 or may be held in slot 54 using external pressure from housing structure 13.

As shown in FIG. 9, additional internal components (e.g., PCB's, integrated circuitry, or other components) may be mounted to rigid support structure 32. Active pixels 38 may extend into portion 56 of flexible display 14 so that active pixels are visible under substantially all of cover layer 30. A minimal edge portion of display 14 may have inactive pixels that are visible under cover layer 30. The minimal edge portion of display 14 that remains visible may be covered with a bezel or a portion of a display cover layer that is coated on its underside with an opaque masking layer such as black ink (as examples).

Figure 10:
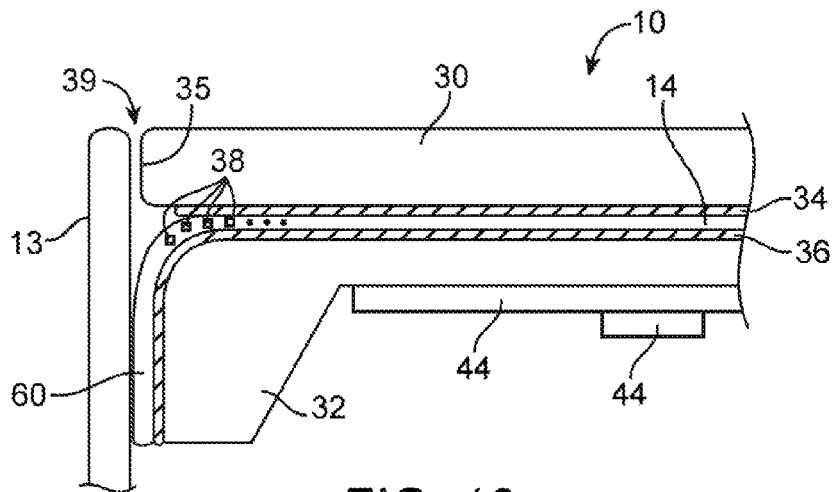
FIG. 10 is a cross-sectional side view of an illustrative electronic device having a display cover layer mounted to flexible display having a portion that is adjacent to a housing sidewall structure in accordance with an embodiment of the present invention.

FIG. 10 is a cross-sectional side view of a portion of an electronic device having a flexible display that is attached to a rigid support member and is mounted adjacent to a housing structure. As shown in FIG. 10, flexible display 14 may be attached to rigid support structure 32 using adhesive 36. Flexible display 14 may have a portion 60 that is bent such that portion 60 is substantially perpendicular to the active display area of display 14.

Flexible display 14 may have a tendency to return to a substantially flat shape. This tendency to return to a substantially flat shape may cause flexible display 14 to exert a restoring force on rigid support structure 32. In order to provide extra resistance against the restoring force of flexible display 14, portion 60 may be positioned such that a housing sidewall such as housing structure 13 is adjacent to portion 60 thereby holding portion 60 against rigid support structure 32.

Figure 11:
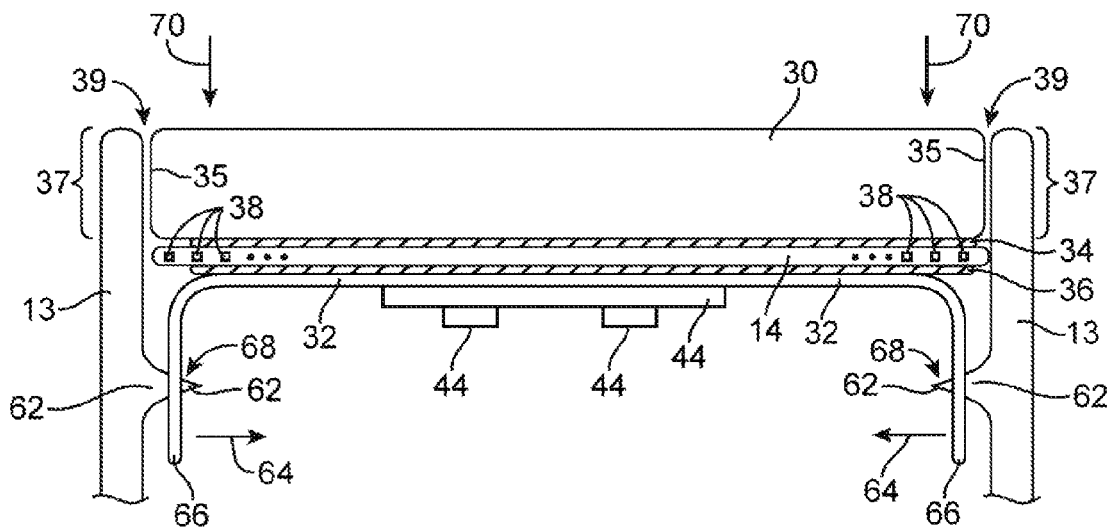
FIG. 11 is a cross-sectional side view of an illustrative electronic device having a rigid support structure that connects to mounting tabs on a housing sidewall structure in accordance with an embodiment of the present invention.

FIG. 11 is a cross-sectional side view of an electronic device having a rigid support member that is mounted to mounting tabs on a device housing structure. As shown in FIG. 11, rigid support structure 32 may have a portion 66 that is bent such that portion 66 is substantially perpendicular to cover layer 30.

Portions 66 of rigid support structure 32 may be provided with openings such as holes 68. Housing structure 13 may be provided with mounting members such as mounting tabs 62. Mounting tabs 62 may be configured to pass through holes 68 in portions 66 of rigid support structure 32. During assembly of device 10, cover layer 30 may be attached to display 14. During assembly of device 10, display 14 may be attached to rigid support structure 32. During assembly of device 10, cover layer 30, display 14, and rigid support structure 32, may be inserted into device 10 in direction 70 (i.e., from the front side of device 10). Portions 66 of rigid support structure 32 may be configured to have some flexibility.

During assembly of device 10, while rigid support structure 32 is moved in direction 70, portions 66 may bend as indicated by arrows 64. During assembly, portions 66 may bend further as rigid support structure 32 is moved further in direction 70 until holes 68 align with mounting tabs 62 of housing structures 12. During assembly, when holes 68 align with mounting tabs 62, portions 66 may "snap" onto mounting tabs 62 (i.e., mounting tabs 62 may enter holes 68 as portions 66 return to a substantially perpendicular position with respect to cover layer 30). Inserting rigid support structure 32 into device 10 until mounting tabs 62 (at least partially) pass through holes 68 may effectively lock rigid support structure 32 into device 10.

Figure 12:
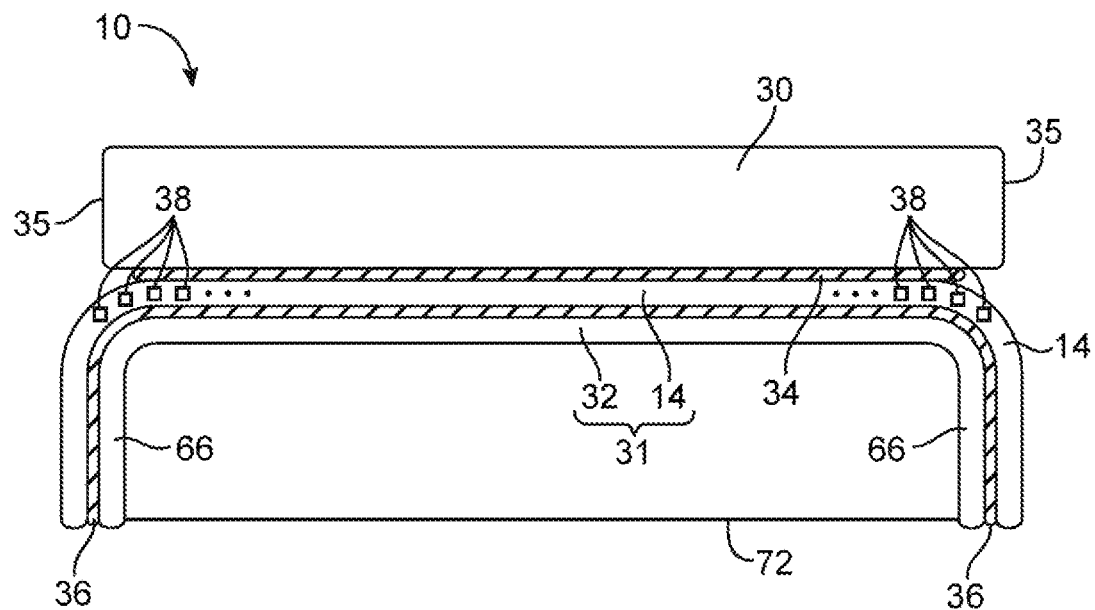
FIG. 12 is a cross-sectional side view of an illustrative electronic device having a tensioning member for maintaining the shape of a rigid support structure in accordance with an embodiment of the present invention.

As shown in the examples of FIGS. 10, 11, and 12, display 14 may be attached to rigid support member 32 using adhesive 36. Cover layer 30 may be attached to device 10 by attaching cover layer 30 to display 14 using adhesive 34.

The example of FIG. 11 in which display 14 covers only the portion of rigid support structure 32 that is parallel to cover layer 30 is merely illustrative. As shown in FIG. 12, flexible display 14 may be bent so that flexible display 14 covers all or part of perpendicular portions 66 of rigid support structure 32. As described above in connection with FIG. 10, flexible display 14 may have a tendency to return to a substantially flat shape. This tendency to return to a substantially flat shape may cause flexible display 14 to exert a restoring force on rigid support structure 32.

As shown in FIG. 12, in order to provide extra resistance against the restoring force of flexible display 14, device 10 may be provided with one or more tensioning members such as tensioning member 72. Tensioning member 72 may be attached to portions 66 of rigid support structure 32. Tensioning member 72 may be formed from a thin wire, a plurality of wires or may be an extended structure that extends in a direction perpendicular to the cross-sectional side view of FIG. 12 along all or part of rigid support structure 32. Tensioning member 72 may be formed of materials such as plastics, carbon-fiber composites and other composites, metal, other materials, or a combination of these materials.

Figure 13:
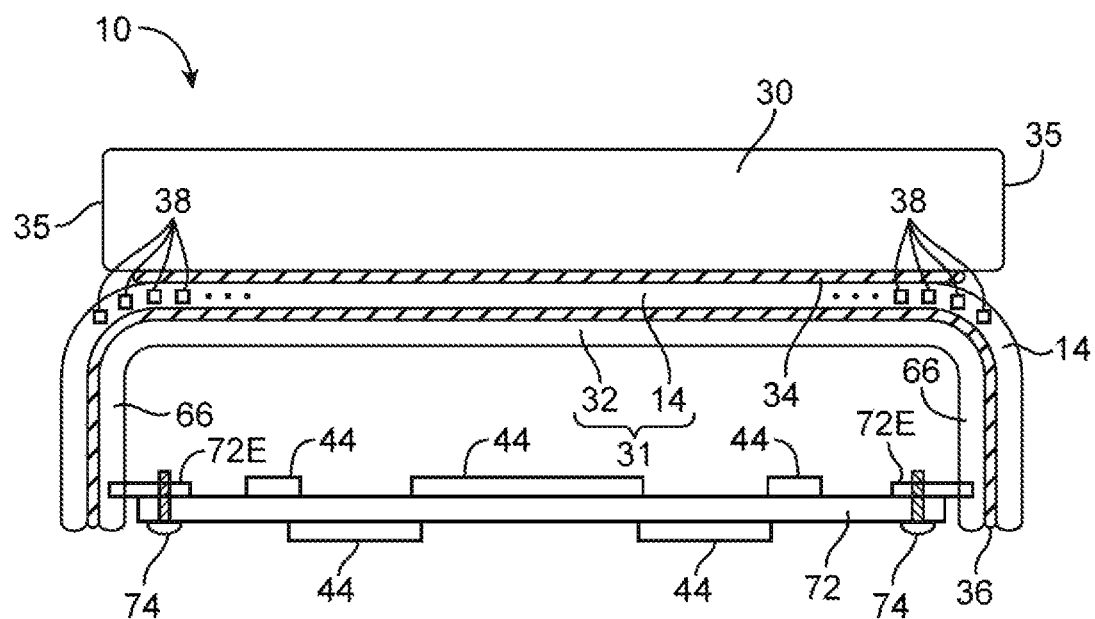
FIG. 13 is a cross-sectional side view of an illustrative electronic device in which a rigid support structure is mounted to a printed circuit board in accordance with an embodiment of the present invention.

If desired, tensioning member 72 may be formed from an active internal component of device 10. As shown in FIG. 13, tensioning member 72 may be a printed circuit board or other active internal component of device 10. Portions 66 of rigid support structure 32 may be attached to additional support members 72E. Additional support members 72E may be attached to printed circuit board 72 so that printed circuit board 72 may provide extra resistance against the restoring force of flexible display 14 on rigid support structure 32. In the example of FIG. 13, PCB 72 is attached to additional support members 72E using screws 74. This is merely illustrative. Rigid support structure 32 may be welded to additional support members 72E or may be attached to additional support members 72E using adhesive or other bonding materials.

Figure 14:
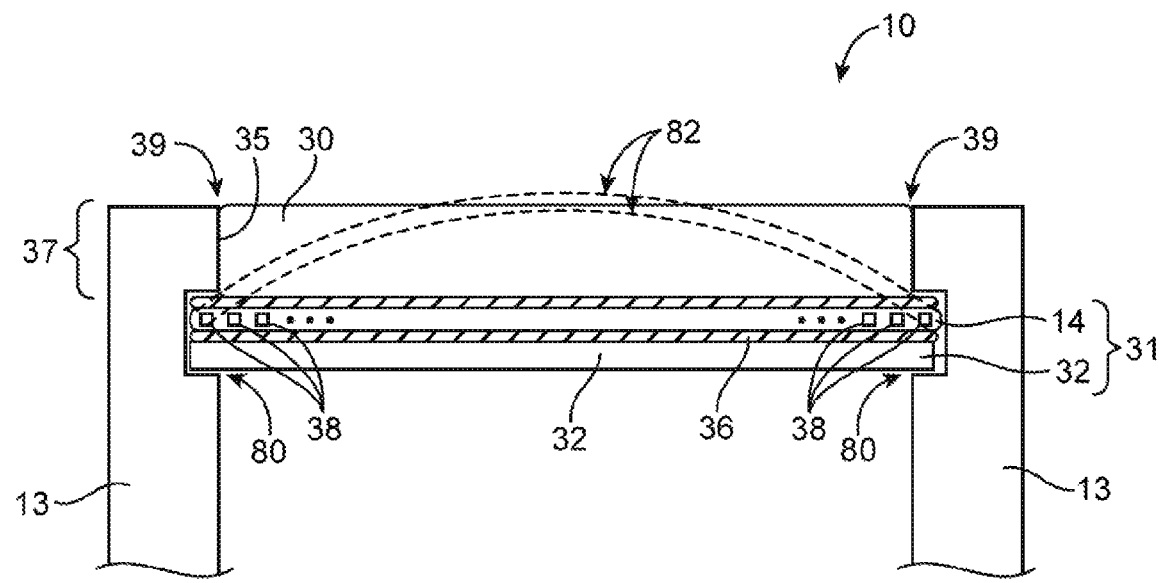
FIG. 14 is a cross-sectional side view of an illustrative electronic device having a notched housing sidewall structure into which a flexible display is mounted in accordance with an embodiment of the present invention.

FIG. 14 is a cross-sectional side view of a portion of an illustrative device such as device 10 in which rigid support structure 32 is mounted in a notch in a housing structure. As shown in FIG. 14 housing structure 13 of device 10 may be provided with an opening such as notch 80. Notch 80 may run along a lateral dimension of device 10. A portion of mounting platform 31 (including a portion of rigid support structure 32 and a portion of display 14) may be mounted in notch 80.

During assembly of device 10, rigid support structure 32 may be attached to housing 12 using any suitable attachment method. During assembly, flexible display 14 may be deformed as indicated by dashed lines 82 so that display 14 may be mounted onto rigid support structure 32 using adhesive such as adhesive 36. During assembly, following mounting display 14 to rigid support structure 32, cover glass 30 may be mounted onto mounting platform 31 by attaching cover glass 30 to flexible display 14 using adhesive such as adhesive 34.

In configurations in which display 14 is mounted between cover glass 30 and a rigid support structure that is mounted in notch 80 in housing structure 13, rigid support may be provided on two sides of display 14. Cover layer 30 may be mounted to device 10 using an adhesive bond with flexible display 14 so that interface 39 between outermost edge 35 of cover layer 30 and portion 37 of housing structure 13 may remain free of adhesive.

Figure 15:
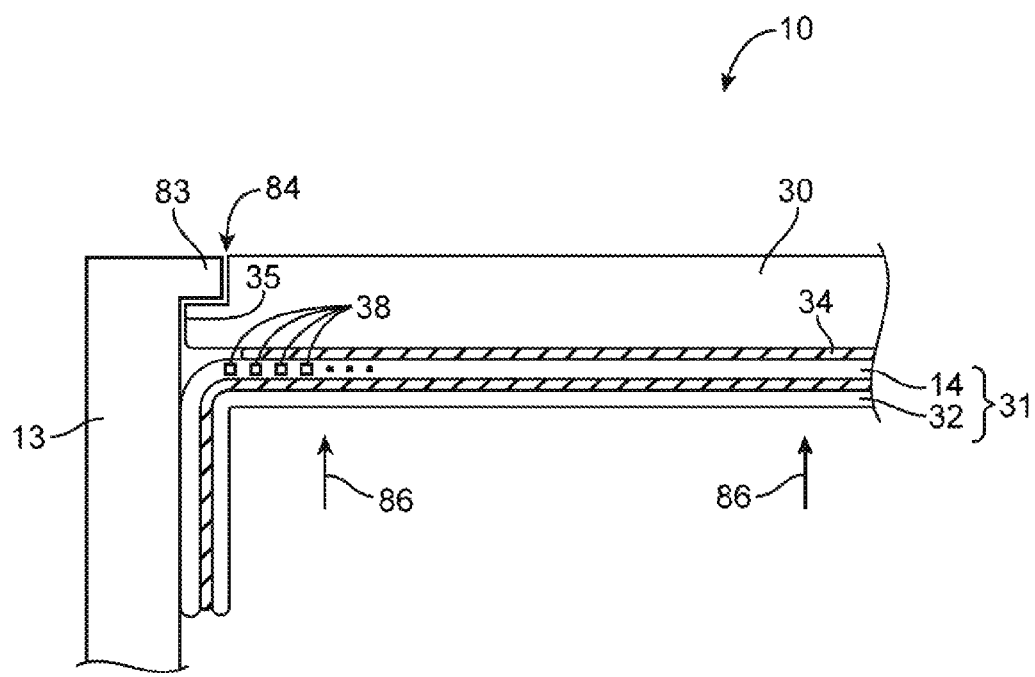
FIG. 15 is a cross-sectional side view of an illustrative electronic device having a notched cover layer in accordance with an embodiment of the present invention.

If desired, electronic device 10 may be provided with housing structures having extended portions for restraining a cover layer as shown in FIG. 15. In the example of FIG. 15, housing structure 13 includes an extended portion 82 that is substantially perpendicular to housing sidewall 13. Cover layer 30 may include a cutaway portion such as notch 84 that is configured to abut portion 82 of housing structure 13.

Notched cover layer 30 may be mounted to a flexible display such as display 14. Display 14 may be mounted to a rigid support structure such as support structure 32. During assembly of electronic device 10, the display package that includes cover layer 30, display 14 and rigid support structure 32 may be inserted into device 10 in direction 86. The display package including notched cover layer 30 may be inserted in direction 86 until notch 84 comes into contact with portion 82 of housing structure 13. Cover layer 30 may therefore be mounted to device 10 by attaching cover layer 30 to display 14 using adhesive 34 and an adhesive-free contact with extended portions 82 of housing 12.

Figure 16:
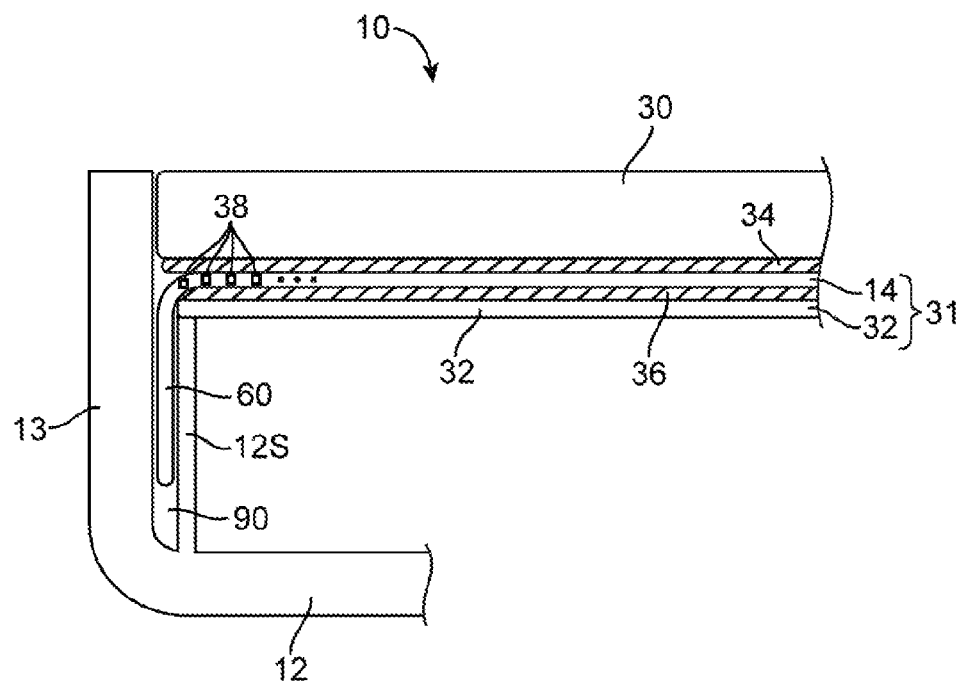
FIG. 16 is a cross-sectional side view of an illustrative electronic device having a housing structure with a slot for a portion of a flexible display in accordance with an embodiment of the present invention.

FIG. 16 is a cross-sectional side view of a portion of an illustrative device 10 having a housing structure with a slotted portion for mounting a portion of a flexible display. As shown in FIG. 16, housing 12 may include an internal separating structure such as slot wall portion 12S that forms a slot 90 between portion 12S and housing sidewall 13. Flexible display 14 may have a portion 60 that is bent such that portion 60 is substantially perpendicular to the active display area of display 14. Portion 60 may be mounted in slot 90. Portion 90 of flexible display 14 may be mounted in slot 90 between housing structure 13 and slot wall portion 12S. If desired, rigid support structure 32 may be attached to slot wall 12S.

Figure 17:
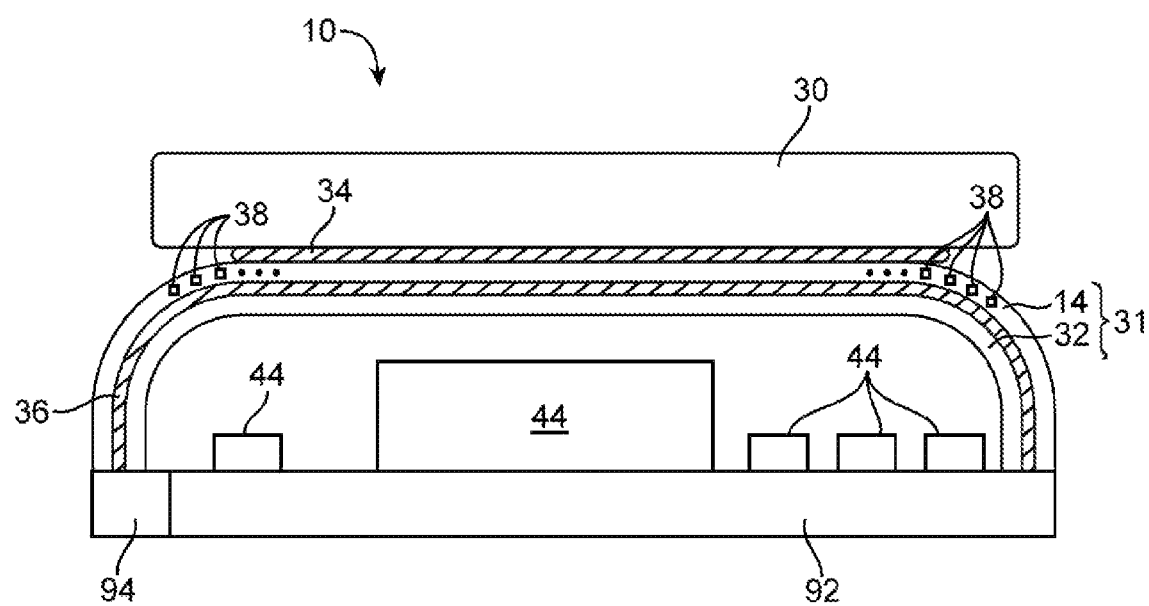
FIG. 17 is a cross-sectional side view of an illustrative electronic device having rigid support structure that forms an electromagnetic shield for device components in accordance with an embodiment of the present invention.

Rigid support structure 32 may be formed from metal or other electrically conducting or heat conducting material. As shown in FIG. 17, rigid support structure 32 may be formed so that rigid support structure 32 substantially surrounds one or more electrical components such as components 44. Components 44 may be mounted to a printed circuit board such as PCB 92.

Rigid support structure 32 may be configured to provide shielding for components 44 from electromagnetic interference (EMI) or may shield other device components from EMI resulting from components 44. Rigid support structure 32 may be formed from heat conducting material (e.g., copper, aluminum, other metal, or other heat conducting material). Rigid support structure 32 may be coupled to a heat sink such as heat sink 94. Rigid support structure 32 may be configured to conduct heat away from flexible display 14 to heat sink 94. Cover layer 30 may be mounted to a flexible display such as display 14 that is mounted to a rigid support structure that serves as an electromagnetic shield for electrical components or that is configured to conduct heat away from the display.

Figure 18:
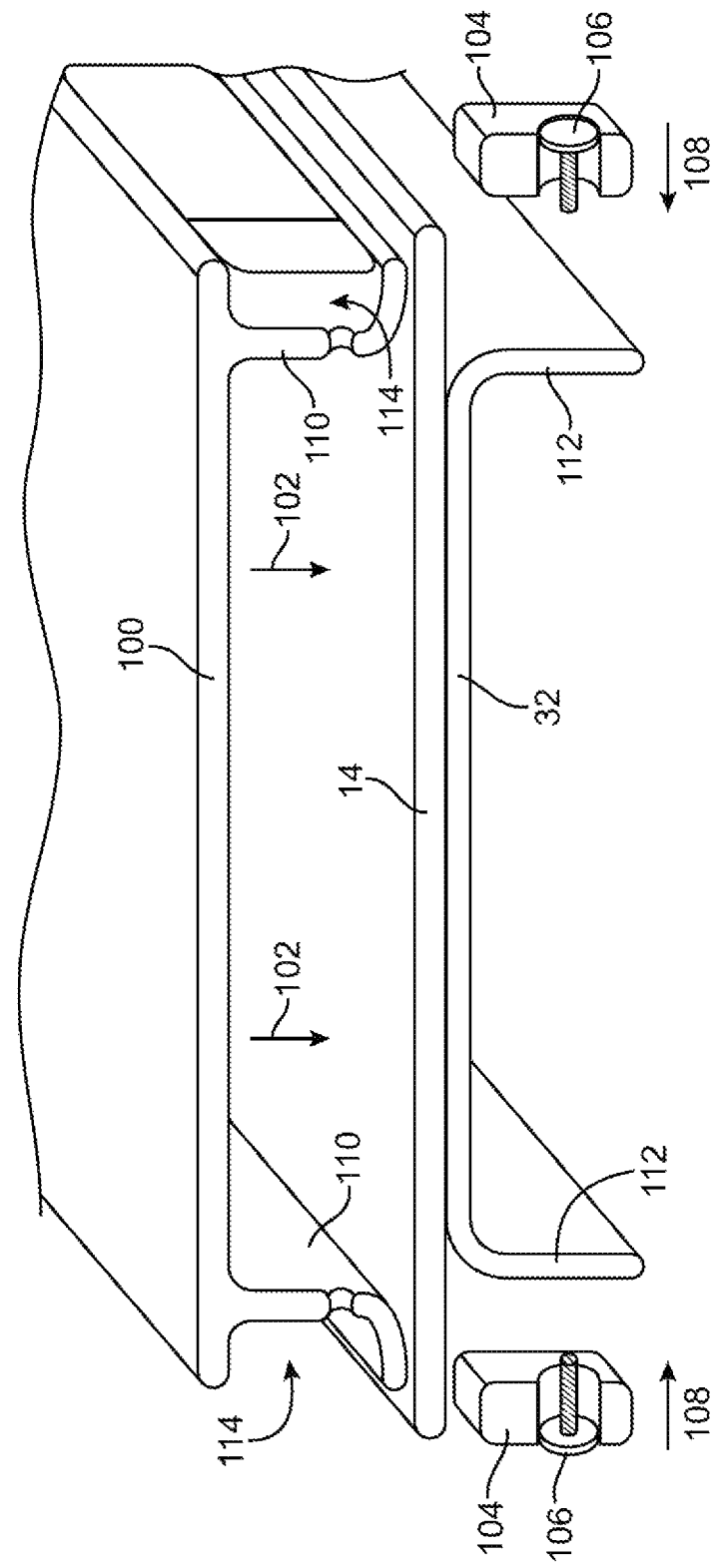
FIG. 18 is a perspective view of an illustrative system for mounting a flexible display to a rigid support structure in accordance with an embodiment of the present invention.
Figure 19:
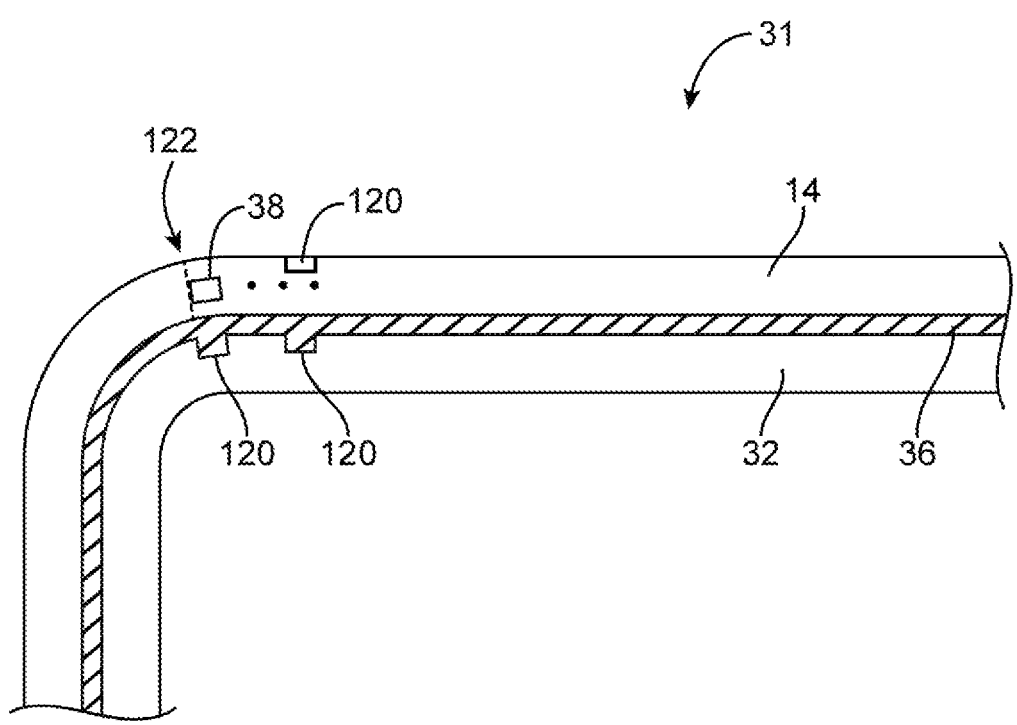
FIG. 19 is a cross-sectional side view of an illustrative electronic device having a flexible display and a rigid support structure that have alignment marks for aligning a flexible display in accordance with an embodiment of the present invention.

FIG. 18 is a perspective view of an illustrative assembly system for mounting a flexible display such as flexible display 14 to a support structure such as rigid support structure 32. The assembly system may include an applicator such as applicator 100. Applicator 100 may have a shape that corresponds to the curved shape of rigid support structure 32. Applicator 100 may be moved in direction 102 in order to press flexible display 14 into contact with rigid support structure 32. While moving in direction 102, the shape (e.g., curved portions 110) of applicator 100 may press flexible display 14 into contact with curved portions 112 of rigid support structure 32.

During assembly, before placing flexible display 14 onto rigid support structure 32, if desired, adhesive 36 may be placed onto rigid support structure 32. Adhesive 36 may bond flexible display 14 to rigid support structure 32. If desired, the assembly system may include one or more fastener delivery members such as screw delivery members 104. Screw delivery members 104 may be configured to carry fasteners such as screws 106 for fastening flexible display 14 to rigid support structure 32.

Applicator 100 may include one or more openings 114 into which screw delivery members 104 may carry screws 106. During assembly, after pressing flexible display 14 into contact with curved portions 112 of rigid support structure 32, screw delivery members 104 may be moved (as indicated by arrows 108) to insert screws 106 through openings 114 in applicator 100 so that screws 106 pass through flexible display 14 and into rigid support structure 32, thereby fastening display 14 to rigid support structure 32.

During assembly, alignment marks may be used to align flexible display 14 with rigid support structure 32. Because rigid support structure 32 may be precisely positioned with respect to housing 12, aligning flexible display 14 to rigid support structure 32 may provide improved alignment of display 14 with edges of housing 12. As shown in FIG. 18, rigid support structure 32 may have one or more alignment marks 120. Alignment marks 120 of rigid support structure 32 may be indentations or other visible marks on rigid support structure 32. Flexible display 14 may have one or more alignment marks 120.

Alignment marks 120 of flexible display 14 may be indentations, visible marks or may simply be a virtual edge such as edge 122 at which the last active display pixel 38 is located. Aligning flexible display 14 to rigid support structure 32 in this way may allow the last active display pixel 38 to be precisely aligned with an edge of housing 12. Alignment of flexible display 14 and rigid support structure 32 may be performed by aligning alignment marks 120 of rigid support structure 32 with alignment marks 120 of flexible display 14 before pressing flexible display 14 into contact with curved portions 112 of rigid support structure 32 (see FIG. 18).

The foregoing is merely illustrative of the principles of this invention and various modifications can be made by those skilled in the art without departing from the scope and spirit of the invention.

What is claimed is:

1. An electronic device, comprising:
   a housing;
   a rigid support structure mounted within the housing;
   a flexible display attached to the rigid support structure; and
   a display cover layer mounted to the flexible display using an adhesive that is interposed between the display cover layer and the flexible display, wherein the flexible display includes first and second portions, wherein the first portion lies in a plane parallel to the display cover layer, wherein the second portion is bent out of plane, wherein the flexible display is attached to the rigid support structure using an additional adhesive that is interposed between the flexible display and the rigid support structure, and wherein the rigid support structure comprises at least one slot and wherein the second portion of the flexible display is bent into the at least one slot.

2. The electronic device defined in claim 1 further comprising a tensioning member attached to the rigid support structure, wherein the rigid support structure has a curved shape, and wherein the tensioning member provides tension to maintain the curved shape of the rigid support structure.

3. The electronic device defined in claim 1 wherein a portion of the flexible display is mounted in contact with both the rigid support structure and a portion of the housing.

4. The electronic device defined in claim 1 further comprising at least one internal component in the housing, wherein the rigid support structure provides electromagnetic shielding for the at least one internal component.

5. The electronic device defined in claim 1 further comprising a heat sink, wherein the rigid support structure is formed from a heat conducting material, and wherein the rigid support structure conducts heat away from the flexible display toward the heat sink.

6. An electronic device, comprising:
   a housing structure;
   a display cover layer;
   a flexible display having a first portion attached to the display cover layer and having a second portion that bends away from the display cover layer, wherein the housing structure and the display cover layer form an enclosure for the electronic device and wherein an interface that is free of adhesive is formed between the display cover layer and the housing structure; and
   a rigid support structure mounted in the housing structure, wherein the rigid support structure has a curved surface and wherein the flexible display layer conforms to the curved surface of the rigid support structure, wherein the housing comprises an internal separating structure, wherein a space between the internal separating structure and a housing sidewall forms a slot, and wherein the second portion of the flexible display is mounted in the slot.

7. The electronic device defined in claim 6 wherein the rigid support structure is mounted to the housing using a fastener.

8. The electronic device defined in claim 6 wherein the rigid support structure is mounted to the housing using mating engagement features on the housing and the rigid support structure.

9. The electronic device defined in claim 8 wherein the engagement features comprise a plurality of mounting tabs on the housing and openings on the rigid support structure and wherein the mounting tabs pass through the openings in the rigid support structure.

10. The electronic device defined in claim 6 wherein the display cover layer comprises a notch, wherein the housing structure comprises a housing sidewall having an extended portion that is substantially perpendicular to the housing sidewall, and wherein the notch in the display cover layer is mounted adjacent to the extended portion of the housing sidewall.

11. The electronic device defined in claim 6 further comprising:
   a printed circuit board that is mounted to the rigid support structure, wherein the rigid support structure has a curved shape and wherein the printed circuit board provides tension to maintain the curved shape of the rigid support structure.

12. An electronic device, comprising:
   a housing structure having an inner sidewall surface;
   a flexible display having a peripheral edge;
   a display cover layer that has a peripheral edge and that covers the flexible display, wherein the peripheral edge of the flexible display and the peripheral edge of the display cover layer are aligned and wherein the peripheral edges of the flexible display and display cover layer contact the inner sidewall surface; and an electrical component, wherein the flexible display is directly attached to the electrical component using an adhesive that is interposed between the flexible display and the electrical component.

13. The electronic device defined in claim 12 wherein the electrical component comprises a battery.

14. The electronic device defined in claim 13 wherein the battery is mounted to the housing structure.

* * * * *